United States Patent [19]

Nelson et al.

[11] Patent Number: 4,678,452

[45] Date of Patent: Jul. 7, 1987

[54] OVERLOAD RELEASE CLUTCH

[75] Inventors: Richard D. Nelson, Safety Harbor; James D. Evans, Clearwater, both of Fla.

[73] Assignee: Performance Feeders, Inc., Clearwater, Fla.

[21] Appl. No.: 759,570

[22] Filed: Jul. 26, 1985

[51] Int. Cl.[4] .......................... F16D 7/04; F16D 3/68

[52] U.S. Cl. .......................... 464/38; 464/73

[58] Field of Search .......................... 192/56 R, 106.1; 464/30, 36, 38, 73

[56] References Cited

U.S. PATENT DOCUMENTS

| | | | |
|---|---|---|---|
| 2,616,273 | 11/1952 | Pringle | 464/73 |
| 3,282,387 | 11/1966 | Becker et al. | 192/56 R X |
| 3,599,067 | 8/1971 | Wallis | 192/56 R X |
| 3,831,724 | 8/1974 | Baer | 464/73 X |
| 3,884,049 | 5/1975 | Pauli | 464/73 |

*Primary Examiner*—Allan D. Herrmann

*Attorney, Agent, or Firm*—Herbert W. Larson; Joseph C. Mason, Jr.

[57] ABSTRACT

A lubricant free low cost overload release clutch having a spring housing with an integral hub, a detector ring containing fixed detent bullets for engagement with springs in the housing on one side, and a bullet detent housing on the other side, together with spider cushion and shaft housing engaged for rotary turning with the bullet detent housing in response to the rotation of a shaft in the shaft housing. The release clutch responds to preset torque limits determined by spring tension. After a disengagement caused by excess torque, the clutch will reset by further rotation of the detent housing.

7 Claims, 6 Drawing Figures

OVERLOAD RELEASE CLUTCH

FIELD OF INVENTION

This invention relates to overload release clutches. More particularly, it refers to a self-releasing clutch which will transmit only a limited amount of torque from one rotary element to another.

BACKGROUND OF THE INVENTION

Overload release clutches have been in existence for a number of years. Many of these are friction type clutches such as set forth in U.S. Pat. No. 3,228,209. This patent describes disk-like clutch elements which are retained in engagement under compression and disengaged at predetermined torque loads. It resets automatically as the overload is relieved. Because of the design limitations in this type friction clutch, it is necessary to make the components primarily of metal. This tends to make the clutch expensive. Another more recent type of friction clutch is set forth in U.S. Pat. No. 3,625,325 wherein a clutching medium in a cavity containing a fluid moves radially outward in a restricted angular passage upon rotation of the housing. This causes common rotational movement of the housing and clutch plate which in turn are connected to a drive and driven member respectively. This centrifical friction clutch provides a controlled gradual acceleration so that the torque output can be varied. Again, because of the nature of a friction clutch device, it must be made primarily of metal and therefore tends to be expensive. Torque release clutches may wait for months or years before required to disengage. If the clutch is made of metal and is subjected to moisture, the resulting rust and corrosion can seize up the unit. When it is most needed, it may fail. Accordingly, a need arises for an overload release clutch not based on friction principles.

SUMMARY OF THE INVENTION

The present invention is an overload release clutch assembly employing high strength polymers and operating on a spring load design without need of any lubricants. Such an overload release clutch can be manufactured at substantially lower cost than the clutches heretofore produced. The assembly involves five basic components; namely, spring housing with an integral hub connected to an output shaft, a detector ring containing fixed detent bullets, a bullet detent housing, a spider cushion and a shaft housing with an integral hub. Loads are transmitted from the outer clutch or shaft housing receiving direct rotary motion from an input shaft through the spider cushion to the detent housing. As the load increases beyond the calculated torque, the detent housing will offset with respect to the detector ring bullets and cause a slippage and disengagement of the output shaft. A further turning of the detent housing resets the clutch assembly.

BRIEF DESCRIPTION OF THE DRAWINGS

The present invention may be best understood by those of ordinary skill in the art by reference to the following detailed description when considered in conjunction with the accompanying drawings in which.

DESCRIPTION OF THE PREFERRED EMBODIMENT

Figures 1, 2, 3:
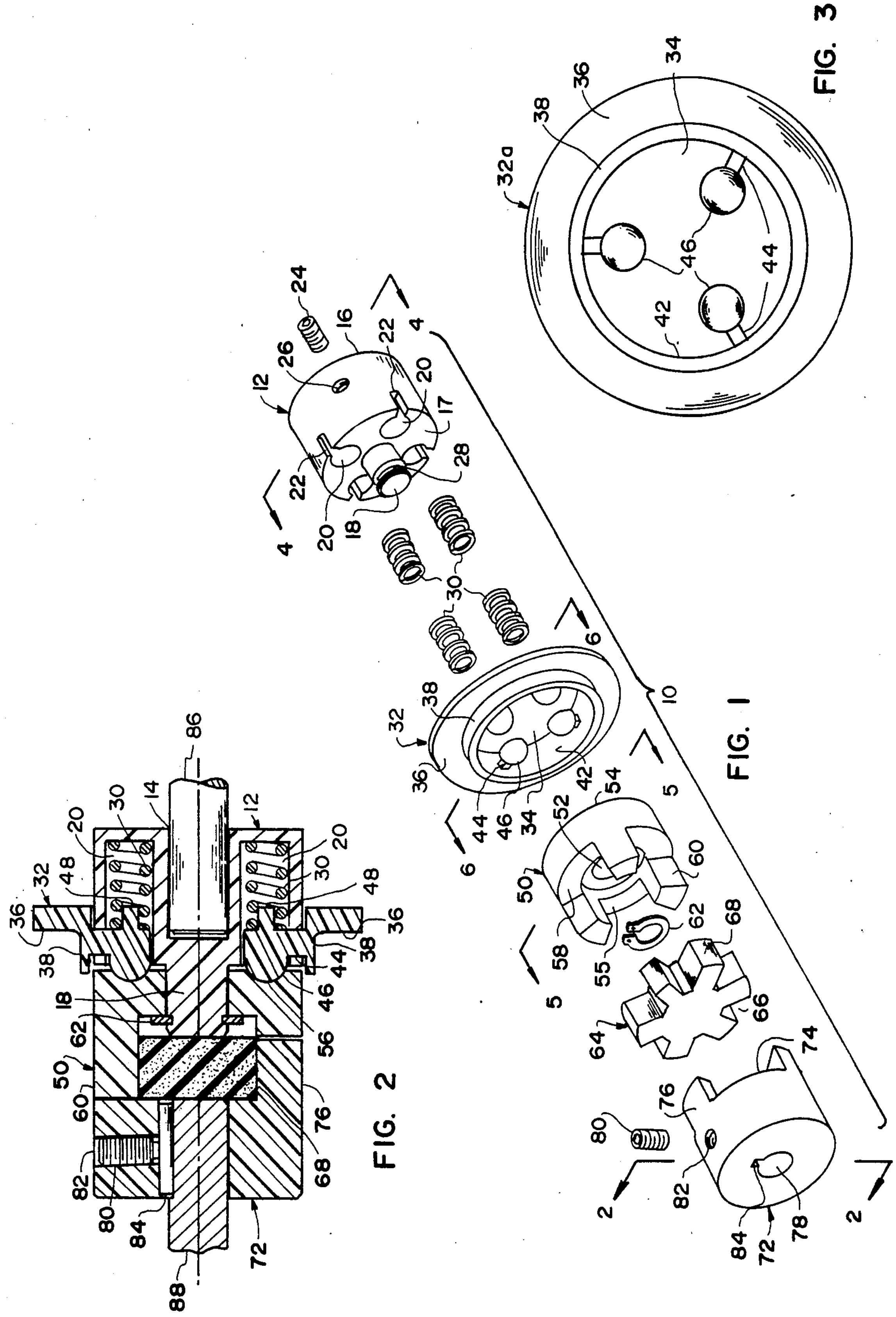
FIG. 1 is an exploded assembly view of one overload release clutch.
FIG. 2 is a cross section along line 2—2 of FIG. 1.
FIG. 3 is a plan view of a detector ring with three detent bullets in place.
Figure 4:
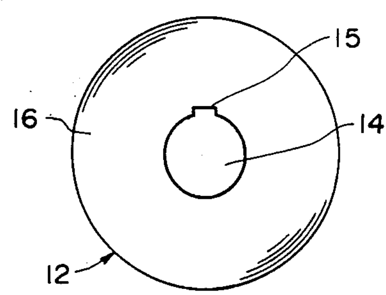
FIG. 4 is a front view of the spring housing in FIG. 1.

The elements of the overload release clutch assembly 10 are set forth in FIG. 1. The spring housing 12 with integral hub 14 has a first side 16 (FIG. 4) and a second side 17. Shaft 86 (FIG. 2) is held in hub 14 by means of a set screw 24 inserted through hole 26 and keyway 15.

The spring housing 12 has a plurality of spring seats 20, being three or more, preferably three to five. One spring seats 20 will correspond in number to the number of springs employed in the release clutch. The number of detent bullets 46 must correspond to the number of springs 30 and to the number of spring seats 20. FIG. 1 shows a clutch assembly with four detent bullets 46 and therefore four springs 30 and four spring seats 20. Each spring seat 20 also has a lateral slot 22 exposing the spring seat 20 to the exterior through the wall of spring housing 12. An integral shaft 18 projects axially from the center of side 17 of the spring housing 12. The shaft 18 has an annular groove 28 near its end for reception of a retainer spring 62.

Figure 6:
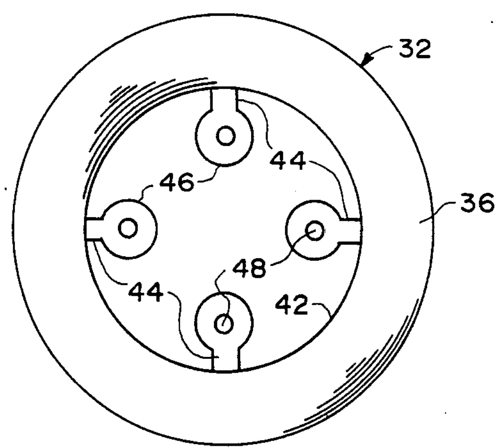
FIG. 6 is a bottom view of the detector ring of FIG. 1.

In loading the overload release clutch 10, the springs 30 are inserted into the spring seats 20. Thereafter the springs 30 are covered with the detent bullets 46. The bottom portion of bullet 46 is substantially flat and rests on the top surface of spring 30. The bullet 46 can optionally have a nipple 48 (FIGS. 2 and 6) projecting from its bottom to enhance quick centering within the spring 30. Each detent bullet 46 is spaced apart at equal distance from its adjacent bullet so as to correspond with the position of each spring 30 in the spring housing 12.

Figure 5:
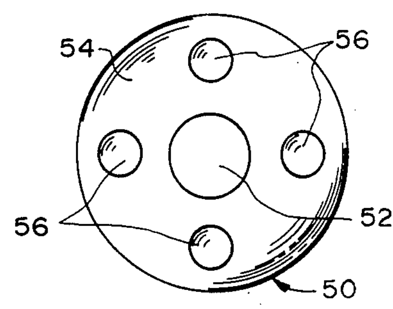
FIG. 5 is a front view of the detent housing of FIG. 1.

The detent bullets 46 are mounted on the interior wall 42 of a detector ring 32 by means of bridge member 44. The detector ring has a collar 36 and a flange 38 enclosing an annular opening 34. This opening is wide enough to accommodate the bullet detent housing 50 which contains on a first side 54, multiple shallow depressions 56 (FIG. 5) which fit over the detent bullets on detector ring 32 when the clutch assembly 10 is loaded. The bullet detent housing 50 has on its second side 55 jaws 58 which are separated by axially projecting lugs 60. The jaws 58 surround an annular opening 52 large enough to accommodate shaft 18 from spring housing 12. The number of jaws and associated lugs may be varied but at least two, and preferably three, jaws are desirable.

The bullet detent housing 50 is pressed down upon the detector ring 32 so as to overcome the pressure exerted by springs 30 seated in the spring seats 20 of housing 12. As the bullet detent housing is pressed down, the bridge members 44 move into slots 22 in the spring housing 12 overcoming the pressure of springs 30. When the bottom of slot 22 is reached the detector ring can move no further. At this point the outer end of shaft 18 is exposed through annular hole 52 so that the retainer spring 62 can be slipped in groove 28. Thus, elements 12, 32 and 50 are held together by retainer ring 62.

Input rotary motion on detent housing 50 beyond the preset torque determined by the coil spring tension will cause the detent bullets 46 to be moved out of depressions 56 in the bullet detent housing 50. Either a clockwise or counterclockwise turn beyond the preset torque will offset the bullets from depressions 56 causing disengagement of shaft 86 located within the spring housing 12. A further turn of the bullet detent housing 50 resets the assembly by putting the detent bullets 46 back into the shallow depressions 56 in the bullet detent housing 50.

The input shaft 88 is held in the hub 78 of shaft housing 72 by way of set screw 80. A spider cushion 64 turns with shaft housing 72.

The spider cushion 64 can be made of an elastomeric material to provide some movement and allowance for variation in shaft tolerances. In this preferred embodiment, the spider cushion has six notches 66 to accommodate the lugs 60 from the bullet detent housing and the lugs 76 from the shaft housing 72. The spider cushion has radiating lugs 68 separating each notch 66.

The shaft housing 72 with integral hub 78 has three jaws 74 corresponding to those in the detent housing 50. These jaws are separated by lugs 76. Jaws 74 fit over the radiating lugs 68 of the spider cushion. At the same time, lugs 76 fit within alternative grooves 66. The shaft housing 72 has a keyway 84 and a hole 82 to accommodate set screw 80. Rotation of shaft 86 with excess torque will cause the turning of shaft housing 72, spider cushion 64 and detent housing 50 without continued rotation of the remainder of the assembly.

FIG. 2 shows the shafts 88 and 86 at each end of the overload release clutch in operating condition.

FIG. 3 shows an alternate embodiment 32a of the detector ring 32, the alternate embodiment containing only three detent bullets 46 instead of four. The exact number of detent bullets is not critical to the invention. However, at least three must be present and it is unlikely that more than five would be necessary. There must be an equal number of springs and spring seats as well as depressions 56 for each detent bullet 46 present in the device.

Springs 30 and 62 are made of high tensile strength steel. The compression strength of springs 30 determines the amount of torque that can be exerted on the device without causing the overload condition to occur. The spider cushion should be made of an elastomeric material and the remaining materials are made of injection molded polymer, usually polyurethane, having a durometer hardness of at least 70 on the F scale. Also, polymers such as DuPont's DELRIN® can be employed and various high strength nylons.

Having just described the invention what is claimed and described to be secured by letters patents is:

1. An overload release clutch assembly comprising (a) a cylindrical spring housing and integral hub with a shaft mounted in the hub at a first end and an axially projecting integral shaft at a second end with a plurality of equally spaced spring seats at the periphery of the housing, each of sufficient depth to accommodate a coil spring and each having a groove exposing an upper portion of the spring seat through an outside wall of the spring housing;

(b) a detector ring having an annular opening sufficient to encompass the spring housing, the ring having an integral axially projecting flange with an inner and outer wall, multiple integrally connected bridging members joining a detent bullet to the inner wall, the bridging members corresponding in number and spacing to the spring seats;

(c) a bullet detent housing containing a central annular opening sufficient in diameter to accept the projecting shaft from the spring housing in a loaded mode and having on a first end engagable with the bullets, multiple shallow depressions corresponding in number and spacing to the detent bullets and on a second end, means for engaging a device for imparting rotary motion to the detent housing;

(d) means mounted on the end of the spring housing integral shaft for holding the spring housing, detector ring and bullet detent housing together; and (e) a means for imparting rotary shaft motion to the detent housing.

2. An overload release clutch assembly according to claim 1 wherein the means for engaging a device for imparting rotary motion to the detent housing comprises three equally spaced jaws projecting axially away from a second end of the bullet detent housing.

3. An overload release clutch assembly according to claim 2 wherein the means for imparting rotary shaft motion to the detent housing comprises a spider cushion having six angularly spaced notches with integral outwardly radiating lugs between each notch and engaged in alternate notches a lug projecting from the detent housing located between each jaw of the detent housing, and on other alternate notches a lug from a shaft housing separating multiple jaws, the jaws of both the bullet detent housing and the shaft housing accommodating the spider lugs between them so that a rotating force exerted on the shaft housing will cause both the spider cushion and the detent housing to turn in a radial direction.

4. An overload release clutch assembly according to claim 1 wherein there are three spring seats in the spring housing, three bridging members with corresponding detent bullets on the detector ring and three shallow depressions on the first end of the detent housing.

5. An overload release clutch according to claim 1 wherein there are four spring seats in the spring housing, four bridging members with corresponding detent bullets on the detector ring and four shallow depressions on the first end of the detent housing.

6. An overload release clutch assembly comprising (a) a cylindrical spring housing with an output shaft mounted within one end of the housing and an axially projecting integral shaft at the other end with multiple spring seats opening in the direction of the projecting shaft each containing a coil spring and a groove in the exterior wall of each spring seat, (b) a detector ring containing multiple mounted bullet members mounted on an inner wall of the detector ring corresponding in space and number to the spring seats, (c) a bullet detent housing having shallow depressions on a first end to accommodate the bullets and means for engaging a device for imparting rotary motion to the detent housing on the second end, (d) means mounted on the end of the spring housing integral shaft for holding the spring housing detector ring and bullet detent housing together, (e) and means for imparting rotary shaft motion to the detent housing.

7. An overload release clutch according to claim 6, wherein the means for holding the spring housing, detector ring and detent housing together is a retainer spring.

* * * * *